J. S. Manning.
Harvester Rake.
No. 17,687          Patented June 30. 1857
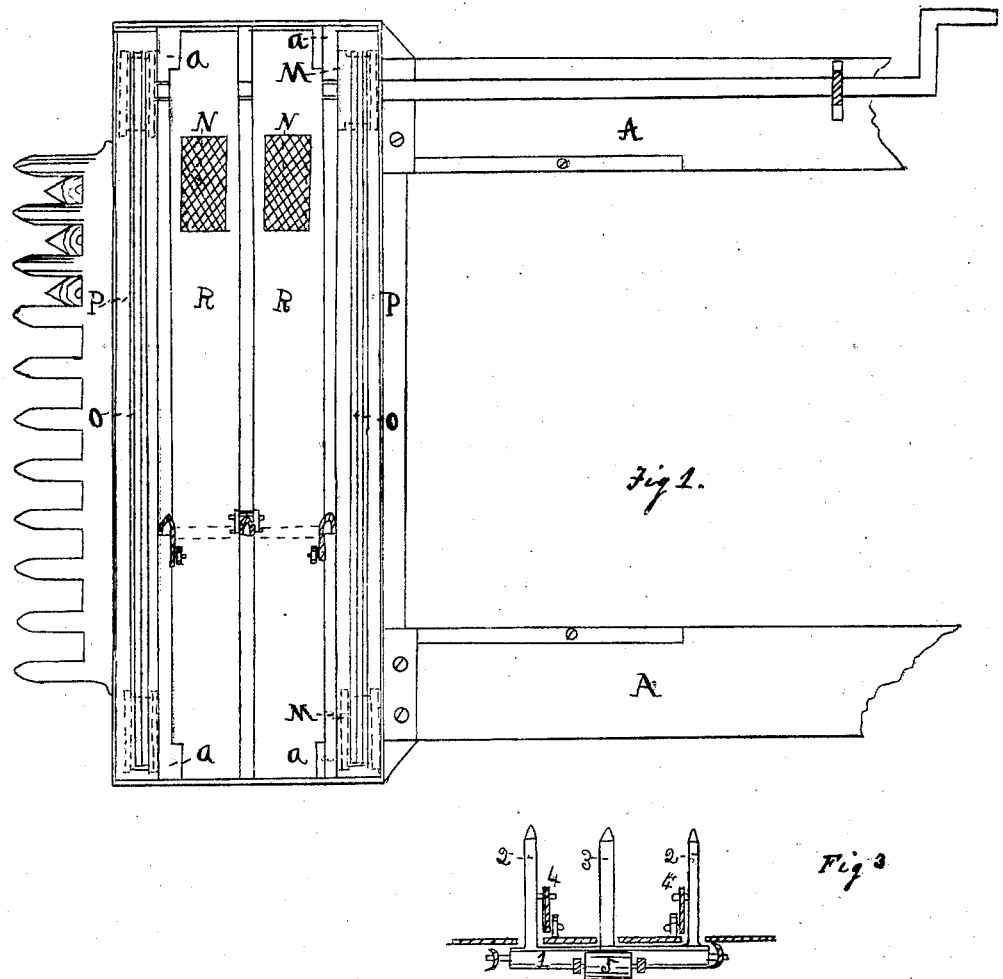
Fig 1.
Fig 3.
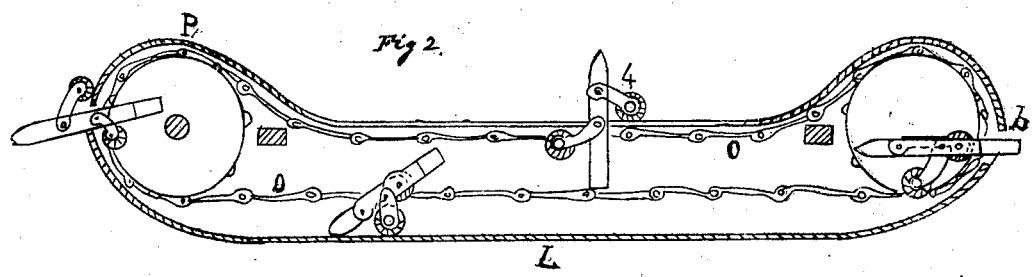
Fig 2.

UNITED STATES PATENT OFFICE.

JOS. S. MANNING, OF PHILADELPHIA, PENNSYLVANIA.

IMPROVED AUTOMATIC RAKE FOR HARVESTERS.

Specification forming part of Letters Patent No. 17,687, dated June 30, 1857.

*To all whom it may concern:*

Be it known that I, JOSEPH S. MANNING, of the city and county of Philadelphia, and State of Pennsylvania, have invented a new and useful Improvement in Automatic Rakes for Harvesters; and I do hereby declare that the following is a full, clear, and exact description thereof, reference being had to the annexed drawings, making part of this specification.

Figure 1 is a top or bird's-eye view of a reaping-machine with the improvement attached thereto; Fig. 2, a section of machine as seen by a person standing in front of cutters; Fig. 3, the rake detached.

This improvement relates to that class of harvesters in which a slat-platform is employed, and from which the cut grain is removed in suitable bundles by means of a traveling rake of a peculiar construction, as will be hereinafter described.

To enable others skilled in the art to make and use my improvements, I will describe them as follows:

I employ the same form of frame, cutters, &c., as described in my former patent, dated 22d January, 1856. Immediately in the rear of the cutters is placed a platform formed of slats or transverse bars P P and R R, it being secured to the side timbers, A A, of the frame of the machine. The central portions of the slats are horizontal and on a level with the cutters, while the ends are curved and raised, as shown in Fig. 2, the curved ends being sufficiently raised above the level portion to allow the bundle of grain to be formed thereon, and then admit of being dropped clear of the stubble and without dragging thereof. The slats are sufficiently separated to allow the teeth of a rake to be protruded and moved freely across the platform.

Under the curved ends are grooved wheels M M', secured on suitable shafts, one of which receives motion from the ground-wheel of the harvester. Two endless chains, O O, (shown in red lines,) pass around the wheels M M'. Being placed parallel to each other, they carry the rake, constructed as follows: A cross-bar, 1, has its ends in journal-boxes in the links of the chains. This forms the rake-head, to which the teeth 2 2 and center one, 3, are secured. The center tooth, 3, is longer than the others, for the purpose of causing the tripping or setting up of the others. On the sides of the teeth 2 2 are swing-bars 4 4, which carry on their lower ends rollers to facilitate the movement of the rake on the upper side of the slats R R; and as these bars and rollers occupy a greater length or space between their journals and the face of the slats than the length on the tooth, consequently they fall behind it and keep it erect while above the platform, but when the tooth has traveled across the platform the rollers are permitted to drop at a wider part, *a*, of the slats. Then the bar 4 drops and falls parallel with the tooth, and folds with it in passing under the platform until the rake arrives at the right-hand side of the platform, as seen from the front of cutters.

On the middle tooth, 3, a roller, 5, is placed below the platform, having its bearings on the under side of the slats. It serves the purpose of assisting in keeping all the teeth erect when said teeth are passing above the platform, and greatly facilitates the movement of the rake. The roller 5 is supported by projections from the side of the bar 1 or rake-head.

N N are riddles or sieves, secured in openings of the slats R R for the purpose of allowing the shattered grain to fall through the meshes of the sieve into the shell L, secured below the platform. From this shell the grain collected therein may be removed by hand when the machine is at rest.

Any number of rakes may be employed, as shown in Fig. 2. The operation is as follows: The machine is pushed ahead of the animals employed, the driving-wheel giving movement to the endless chains and traveling rakes. As the teeth thereof pass above the slats they gather the cut grain into bundles and drop it from the ends of the platform. When the rollers on the levers 4 4 drop through the openings *a a* the teeth fold by the turning of the bar 1, so as to admit of the rake passing below the platform. Having reached the right side of the same, the end of the center tooth projects through an opening, *b*, the chains in the meanwhile passing on, causes the teeth 2 2 and 3 to be set up, ready for another clearing of the cut grain from the platform.

It will be seen that the bars 4 4, &c., are hung so as to vibrate or swing on their respective teeth, and by means of which they are permitted to fold up while passing under the platform, so as to occupy but little room, and yet so arranged as to form a very strong support to and in rear of the teeth while the grain is being removed from the platform.

It will also be noticed that by my arrangement the slats are not liable to spring and bend, since the rollers attached to bars 4 4, by their peculiar action, tend to equalize the strain and render the action of the rake easy.

Having thus fully described my invention, what I claim therein as new, and for which I desire Letters Patent, is—

The above-described raking device, consisting of cross-bar 1, teeth 2 2 and 3, swinging bars 4 4, and supporting-roller 5, when the same is used in combination with the peculiarly-constructed platform P P R R, in the manner and for the purpose above set forth.

In testimony whereof I have hereunto signed my name before witnesses.

JOS. S. MANNING.

Witnesses:
   JOHN F. CLARK,
   JOHN S. HOLLINGSHEAD.